(12) United States Patent
Liu et al.

(10) Patent No.: US 8,937,133 B2
(45) Date of Patent: Jan. 20, 2015

(54) DISSOLUBLE PDMS-MODIFIED P(HEMA-MAA) AMPHIPHILIC COPOLYMER AND METHOD FOR FABRICATING THE SAME

(71) Applicant: National Chiao Tung University, Hsinchu (TW)

(72) Inventors: Dean-Mo Liu, Jhubei (TW); Yun-Chun Huang, Kaohsiung (TW); Chung-Yu Hsu, Yunlin County (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 14/255,737

(22) Filed: Apr. 17, 2014

(65) Prior Publication Data

US 2014/0228522 A1    Aug. 14, 2014

Related U.S. Application Data

(63) Continuation-in-part of application No. 13/743,778, filed on Jan. 17, 2013.

(30) Foreign Application Priority Data

Sep. 25, 2012   (TW) .............................. 101135075 A

(51) Int. Cl.
*C08F 220/28*   (2006.01)
*C08F 222/28*   (2006.01)
(Continued)

(52) U.S. Cl.
CPC ............. *C08F 220/28* (2013.01); *C08F 265/00* (2013.01); *C08F 8/00* (2013.01)
USPC ........................................ 525/329.5; 525/342

(58) Field of Classification Search
None
See application file for complete search history.

(56) References Cited

U.S. PATENT DOCUMENTS 5,962,548 A * 10/1999 Vanderlaan et al. .......... 523/107
6,762,264 B2 * 7/2004 Kunzler et al. ............... 526/279
(Continued)

FOREIGN PATENT DOCUMENTS

EP    0494842 A2    7/1992
EP    1043605 A1    10/2000
(Continued)

OTHER PUBLICATIONS

Castellino, Victor et al., "The hydrophobicity of silicone-based oils and surfactants and their use in reactive microemulsions", *Journal of Colloid and Interface Science* 353 (2011) pp. 196-205.
(Continued)

*Primary Examiner* — Robert S Loewe
(74) *Attorney, Agent, or Firm* — Muncy, Geissler, Olds & Lowe, P.C.

(57) ABSTRACT

The present invention discloses a dissoluble PDMS-modified p(HEMA-MAA) amphiphilic copolymer and the method of fabricating the same. The amphiphilic copolymer of the present invention is fabricated via chemically bonding HEMA, MAA, and poly(dimethylsiloxane), bis(3-aminopropyl) terminated (PDMS) in aqueous solution. The PDMS-modified p(HEMA-MAA) amphiphilic copolymer can be dissolved completely in polar solvents, particularly alcohol solvents, to facilitate subsequent processing. The amphiphilic copolymer features adjustable hydrophobic-hydrophilic properties and exhibits excellent biocompatibility. Thus, it can be utilized in a number of advanced applications, including anti-fouling and drug delivery.

21 Claims, 8 Drawing Sheets dp(HEMA-MAA)

PDMS-NH$_2$

(51) Int. Cl.
*C08F 265/00* (2006.01)
*C08F 8/00* (2006.01)

(56) References Cited

U.S. PATENT DOCUMENTS

| | | | |
|---|---|---|---|
| 6,943,203 | B2 | 9/2005 | Vanderlaan et al. |
| 7,384,781 | B2 | 6/2008 | Moyle et al. |
| 7,468,398 | B2 | 12/2008 | Nicolson et al. |
| 7,538,146 | B2 | 5/2009 | Nicolson et al. |
| 7,741,106 | B2 | 6/2010 | Moyle et al. |
| 7,968,650 | B2 | 6/2011 | Tighe et al. |
| 8,003,710 | B2 | 8/2011 | Medina et al. |
| 8,071,658 | B2 | 12/2011 | Zhou et al. |
| 8,079,703 | B2 | 12/2011 | Chang et al. |
| 8,158,695 | B2 | 4/2012 | Vanderlaan et al. |
| 2008/0231798 | A1* | 9/2008 | Zhou et al. ............... 351/160 H |
| 2010/0296049 | A1* | 11/2010 | Justynska et al. ........ 351/160 H |
| 2013/0323295 | A1* | 12/2013 | Scales et al. ................. 424/429 |

FOREIGN PATENT DOCUMENTS

| | | |
|---|---|---|
| EP | 1754728 A1 | 2/2007 |
| EP | 2202254 A1 | 6/2010 |
| EP | 2270550 A2 | 1/2011 |
| EP | 2270551 A2 | 1/2011 |
| EP | 2270552 A2 | 1/2011 |
| WO | WO-99/11683 | 3/1999 |
| WO | WO-2006/084275 A2 | 8/2006 |
| WO | WO-2008/060574 A2 | 5/2008 |
| WO | WO-2008/076729 A1 | 6/2008 |
| WO | WO-2008/116131 A2 | 9/2008 |
| WO | WO-2010/117588 A1 | 10/2010 |
| WO | WO-2011/034801 A1 | 3/2011 |
| WO | WO-2011/056761 A1 | 5/2011 |

OTHER PUBLICATIONS

Kim, Jinah et al., "Extended release of dexamethasone from silicone-hydrogel contact lenses containing vitamin E", *Journal of Controlled Release* 148 (2010) pp. 110-116.

Vargun, Elif et al., "Synthesis and surface properties of polydimethylsiloxane-based block copolymers: poly[dimethylsiloxane—block—(ethyl methacrylate)]", *Polym Int* 2010; 59, pp. 1586-1597.

Chen, Wei-Hung et al., UV-curable PDMS-containing PU system for hydrophobic textile surface treatment, *J Polym Res* (2009) 16, pp. 601-610.

\* cited by examiner

✻     dp(HEMA-MAA)

～     PDMS-NH$_2$

DISSOLUBLE PDMS-MODIFIED P(HEMA-MAA) AMPHIPHILIC COPOLYMER AND METHOD FOR FABRICATING THE SAME

RELATED APPLICATIONS

The present invention is a continuous-in-part application of the application that is entitled "DISSOLUBLE PDMS-MODIFIED p(HEMA-MAA) AMPHIPHILIC COPOLYMER AND METHOD FOR FABRICATING THE SAME" (application Ser. No. 13/743,778), which is filed presently with the U.S. Patent & Trademark Office, and which is used herein for reference in its entirety.

BACKGROUND OF THE INVENTION

1. Field of the Invention

The present invention relates to a high-workability siloxane derivative and a method for fabricating the same, particularly to a dissoluble PDMS-modified p(HEMA-MAA) amphiphilic copolymer and a method for fabricating the same.

2. Description of the Related Art

Siloxane has become an emerging material because of its mechanical and physical properties. However, the academia and industry still need to break through the technology bottlenecks of fabricating hydrophilic monomers of siloxane-containing polymers or hydrophilically modifying the surface of siloxane-containing polymers.

The silicone-hydrogel soft contact lenses are very popular now because of its high wearing comfort and obviously-increased oxygen permeability. However, the protein and lipid secreted by eyes are likely to deposit on the hydrophobic surface of the silicone-hydrogel contact lenses, irritating the eyes and dimming the vision. The problem also shortens the service life of contact lenses. The current surface hydrophilic modification technology of silicone hydrogel is mainly realized by the chemical reaction of the functional groups on the surface of silicone hydrogel or the grafting reaction of radicals. However, the abovementioned technology can only apply to the functional groups on the surface of silicone hydrogel. Besides, the reaction condition thereof is more complicated. Further, the hydrophilic monomers for siloxane polymerization must use alcohols containing more than four carbon atoms as the diluents. Furthermore, phase separation may take place and impair fabrication in the abovementioned technology unless the polymerization rate and the ratio of the hydrophilic monomer and the diluent are strictly controlled.

The commercial silicone hydrogel and silicone hydrogel-containing polymeric materials are cross-linked with heat or ultraviolet (UV) ray, and they are no more soluble after polymerized. Besides, the abovementioned polymerized method is likely to damage UV-sensitive or heat-sensitive drugs and active molecules.

Therefore, it is desired by the field concerned to develop a high commercial potential poly(dimethylsiloxane) (PDMS)-modified copolymer, which keeps the advantages of PDMS and can be fabricated in simple solving and curing processes to achieve various functions, such as a drug delivery function for prolonging the release of drugs. Based on the abovementioned causes, the present invention proposes a dissoluble PDMS-modified p[HEMA (2-hydroxyethyl methacrylate)-MAA (methacrylic acid)] amphiphilic copolymer and a method for fabricating the same.

SUMMARY OF THE INVENTION

The primary objective of the present invention is to provide a dissoluble PDMS-modified p(HEMA-MAA) amphiphilic copolymer and a method for fabricating the same, wherein a simple process is used to join PDMS (poly(dimethylsiloxane), bis(3-aminopropyl) terminated) and the hydrophilic p[HEMA (2-hydroxyethyl methacrylate)-MAA (methacrylic acid)] copolymer to form a PDMS-modified p(HEMA-MAA) amphiphilic copolymer, which dissolves in alcohols containing less than three carbon atoms and has higher hydrophilicity than the traditional silicone hydrogel, and wherein the amphiphilic copolymer features surface hydrophobicity and dissolves in polar solvents, wherefore the amphiphilic copolymer has high workability and can apply to various hydrophobically-modified anti-fouling coating materials.

Another objective of the present invention is to provide a dissoluble PDMS-modified p(HEMA-MAA) amphiphilic copolymer, which has high workability, high hydrophobicity, high oxygen permeability and super biocompatibility and can apply to various fields of biomedicine.

To achieve the abovementioned objectives, the present invention proposes a dissoluble PDMS-modified p(HEMA-MAA) amphiphilic copolymer, which contains compounds respectively expressed by Structural Formula I and Structural Formula II:

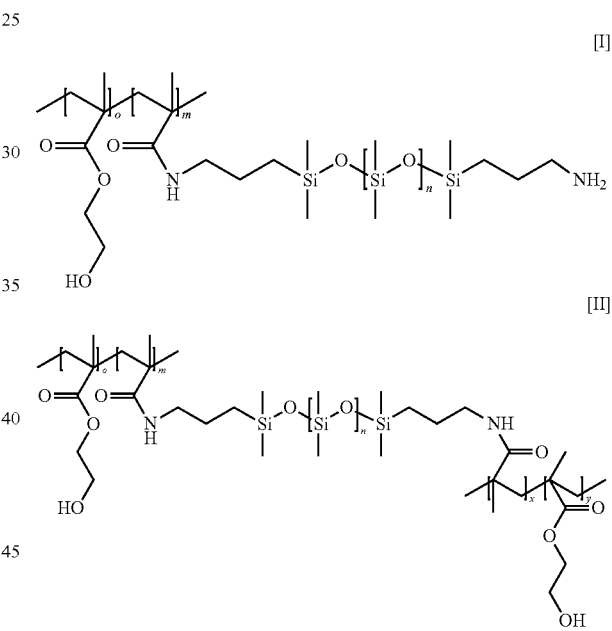

and wherein m is an arbitrary integer of 1~10, n is an arbitrary integer of 1~40, x is an arbitrary integer of 1~10, y is an arbitrary integer of 1~10, and o is an arbitrary integer of 1~10.

The amphiphilic copolymer can be dissolved in polar solvents to facilitate subsequent processing. The amphiphilic copolymer has adjustable hydrophilic-hydrophobic properties and superior biocompatibility and can be used in anti-fouling and drug delivery.

The present invention also proposes a method for fabricating a dissoluble PDMS-modified p(HEMA-MAA) amphiphilic copolymer containing compounds respectively expressed by Structural Formula I and Structural Formula II. The method of the present invention comprises steps: dissolving 2-hydroxyethyl methacrylate (HEMA) and methacrylic acid (MAA) in deionized water in given proportions to form a first solution, adding a photo initiator to the first solution to form a second solution, agitating the second solution uniformly, and illuminating the second solution with ultraviolet ray to polymerized compounds in the second solution to form a third solution, which is a white-colored solution containing a copolymer; adding an activating reagent and an alcohol solvent to the third solution containing the copolymer to form a fourth solution, and agitating the fourth solution uniformly to form a mixture solution; slowly dripping a dimethylsiloxane (DMS) solution to the mixture solution to form a fifth solution, adding a catalyst to the fifth solution to form a sixth solution and, and agitating the sixth solution uniformly to let reaction proceed in the sixth solution and form a solution of a poly(dimethylsiloxane)(PDMS)-modified p(HEMA-MAA) amphiphilic copolymer.

In addition, the solution of the PDMS-modified p(HEMA-MAA) amphiphilic copolymer is further dialyzed to form a powdered amphiphilic copolymer.

Below, embodiments are described in detail in cooperation with the attached drawings to make easily understood the objectives, technical contents, characteristics and accomplishments of the present invention.

DETAILED DESCRIPTION OF THE INVENTION

The present invention discloses an amphiphilic copolymer PDMS-modified p(HEMA-MAA), which is synthesized via chemically bonding 2-hydroxyethyl methacrylate (HEMA), methacrylic acid (MAA), and poly(dimethylsiloxane), bis(3-aminopropyl) terminated (PDMS) in an aqueous solution, which is also called the p(HEMA-MAA)-PDMS amphiphilic copolymer thereinafter. The PDMS-modified p(HEMA-MAA) amphiphilic copolymer can completely dissolve in alcohol solvents to facilitate the succeeding fabrication. The amphiphilic copolymer of the present invention has adjustable hydrophilicity and superior biocompatibility and thus can apply to fouling prevention and drug delivery.

The PDMS-modified p(HEMA-MAA) amphiphilic copolymer of the present invention simultaneously contains compounds respectively expressed by Structural Formula I and Structural Formula II:

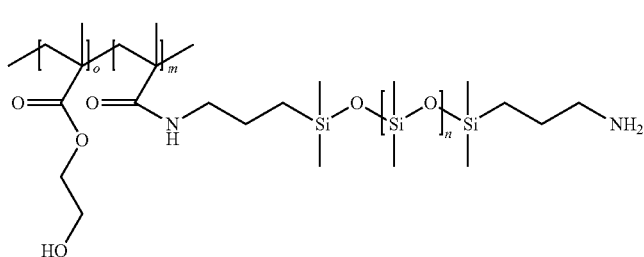

[I]

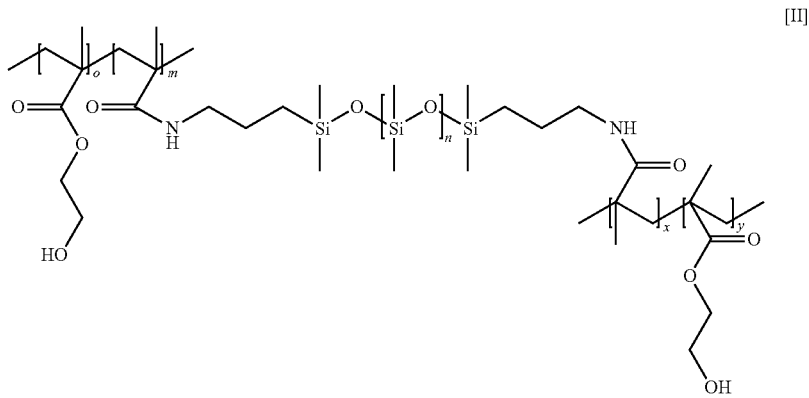

[II]

and wherein m is an arbitrary integer of 1~10, n is an arbitrary integer of 1~40, x is an arbitrary integer of 1~10, y is an arbitrary integer of 1~10, and o is an arbitrary integer of 1~10.

Figure 1:
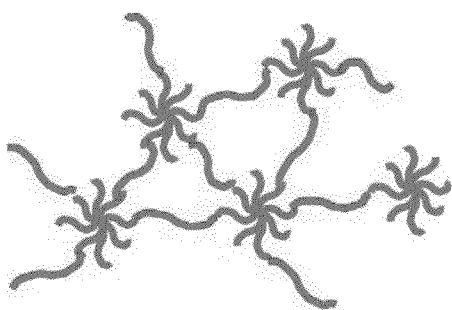
FIG. 1 schematically shows the crosslinking state of an amphiphilic copolymer according to one embodiment of the present invention.

Refer to FIG. 1 for the crosslinking state of the amphiphilic copolymer. The amphiphilic copolymer simultaneously contains hydrophilic terminals and hydrophobic terminals. The hydrophilic terminals are provided by HEMA and MAA, which respectively contribute a hydroxyl group and a carboxylic acid group as the hydrophilic functional groups. Ultraviolet ray is used to induce the radical copolymerization reaction of HEMA and MAA. The hydrophobic terminals is contributed by the poly(dimethylsiloxane), bis(3-aminopropyl) terminated. The dimethylsiloxane of the PDMS derivative is very hydrophobic and provides superior oxygen permeability for the amphiphilic copolymer of the present invention.

The amphiphilic copolymer of the present invention can dissolve in a polar solvent, such as ethanol, propanol, isopropyl alcohol, polyethylene glycol, polypropylene glycol, methyl sulfoxide, or the mixture of some of the abovementioned solvents. The amphiphilic copolymer has a molecular weight of 3500-30000 and can self-assemble into spherical nanoparticles having a diameter of 30-40 nm. The amphiphilic copolymer can be fabricated into a transparent film or a nanoparticle to transport drugs in the succeeding fabrication process.

Below is described the method for fabricating the PDMS-modified p(HEMA-MAA) amphiphilic copolymer. Firstly, dissolve HEMA and MAA by a weight ratio of from 100:10 to 100:100 in deionized water to form a first solution, wherein the weight ratio of HEMA plus MAA to deionized water is from 1:100 to 10:100. Next, add a photo initiator to the first solution, such as 2-hydroxy-2-methyl propiophenone (Darocur 1173), to form a second solution, and agitate the second solution uniformly. Next, illuminate the second solution with ultraviolet ray to polymerize the compounds in the second solution to form a third solution, which is a white-colored solution containing copolymers. Next, add an activating reagent and an alcohol solvent to the third solution to form a fourth solution, and agitate the fourth solution uniformly to form a mixture solution. Next, slowly drip a pre-mixed DMS solution to the mixture solution to form a fifth solution, wherein the pre-mixed DMS solution is a solution of dimethylsiloxane and an alcohol solvent. Next, add a catalyst, such as EDC (1-Ethyl-3-(3-dimethylaminopropyl)), to the fifth solution to form a sixth solution, and agitate the sixth solution uniformly to accelerate the reaction. Let the reaction proceed for one day to form a solution of the PDMS-modified p(HEMA-MAA) amphiphilic copolymer of the present invention.

After the solution of the PDMS-modified p(HEMA-MAA) amphiphilic copolymer is done, the amphiphilic copolymer solution can be further dialyzed to form powered amphiphilic copolymer with a dialysate, such as isopropyl alcohol, propanol or ethanol. The powered amphiphilic copolymer can be re-dissolved in a polar solvent, such as ethanol, propanol, isopropyl alcohol, polyethylene glycol, polypropylene glycol, methyl sulfoxide, or a mixture of some of the abovementioned solvents for the succeeding application. Besides, the powered amphiphilic copolymer can also dissolve in water and self-assemble to form spherical nanoparticles having a diameter of 30-40 nm.

In the present invention, the copolymer (HEMA+MAA) is covalently bonded with DMS (dimethylsiloxane) by a ratio of from 100:1 to 100:40. The abovementioned alcohols or alcohol solvents include ethanol, propanol, isopropyl alcohol, polyethylene glycol, polypropylene glycol, and the mixtures of some of the abovementioned solvents.

The PDMS-modified p(HEMA-MAA) amphiphilic copolymer and the method for fabricating the same have been described above. Below, embodiments and experiments are used to further demonstrate the present invention.

Below is described the detailed process for fabricating the PDMS-modified p(HEMA-MAA) amphiphilic copolymer, i.e. the p(HEMA-MAA)-PDMS amphiphilic copolymer, of the present invention. Firstly, mix 1 ml of HEMA and 1 ml of MAA uniformly to form Solution 1. Next, add 98 ml of deionized water and 40 µl of water-soluble photo initiator (Darocur 1173) into Solution 1 to form Solution 2. Next, agitate Solution 2 for 10 minutes, and use ultraviolet ray to polymerize the components in Solution 2 during agitation to form Solution 3, which is a white-colored solution containing a dissoluble polymer of HEMA and MAA, called dp(HEMA-MAA) thereinafter. Next, add 50 ml of isopropyl alcohol, propanol, or ethanol to Solution 3, and agitate them uniformly to form a transparent solution. Next, add several drops of activating reagent(NHS) to the transparent solution to form Solution 4, and agitate Solution 4 uniformly to form a mixture solution. Next, slowly drip 400 µl of PMDS solution to the mixture solution to form Solution 5, and add several drips of catalyst (EDC) to Solution 5 to form Solution 6, and agitate Solution 6 for 24 hours at an ambient temperature to facilitate reaction. Next, add isopropyl alcohol, propanol, or ethanol to the resultant solution, and dialyze the resultant solution for 72 hours. Next, dry the product of dialysis at an oven. Next, crush the dried product into a pale-yellow powder of the p(HEMA-MAA)-PDMS amphiphilic copolymer, which is also called HMPMS thereinafter.

Figure 2:
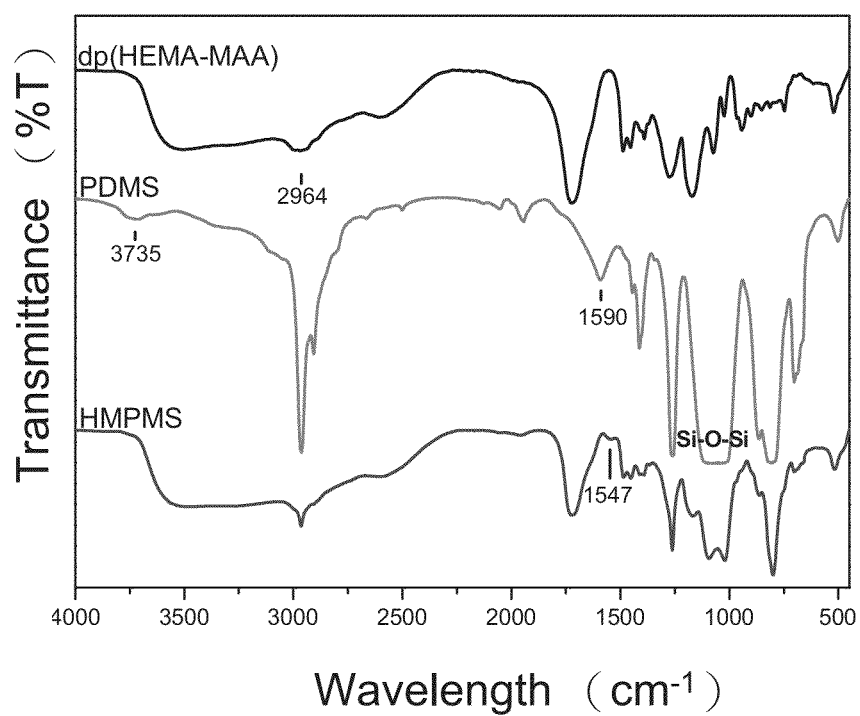
FIG. 2 shows the results of using the Fourier-Transform Infrared (FT-IR) absorption spectrometry to analyze dp(HEMA-MAA), PDMS, and HMPMS.

Refer to FIG. 2 the results of using the Fourier-Transform Infrared (FT-IR) absorption spectrometry to analyze dp(HEMA-MAA), PDMS, and HMPMS. The absorption peak at 2964 cm$^{-1}$, which is observed in the transmittance IR curve of dp(HEMA-MAA), is generated by the stretching vibration of OH of COOH of dp(HEMA-MAA). After dp(HEMA-MAA) is modified by PDMS, the absorption by OH stretching vibration is attenuated. The absorption peaks at 1590 cm$^{-1}$ and 3735$^{-1}$ are respectively generated by the bending vibration and stretching vibration of $NH_2$ of unmodified PDMS. The two $NH_2$ absorption peaks of unmodified PDMS disappear after modification. It indicates that the functional group COOH of dp(HEMA-MAA) reacts with $NH_2$ of PDMS. The absorption peak at 1110 cm$^{-1}$ is generated by the stretching vibration of Si—O—Si. The absorption peak at 1547 cm$^{-1}$ is generated by the stretching vibration of the amide bond of HMPMS.

Figure 3:
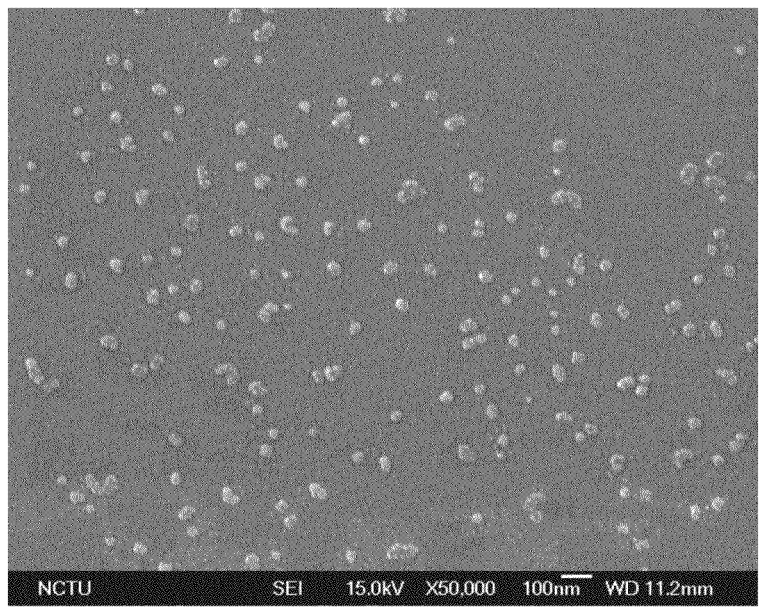
FIG. 3 shows an SEM image of spherical nanoparticles formed by the aggregation of an amphiphilic copolymer according to one embodiment of the present invention.

The amphiphilic copolymer of the present invention can uniformly dissolve in solvents such as IPA, propanol, and ethanol. In a mixed solvent of IPA and $H_2O$ by a ratio of 1:2, the amphiphilic copolymer would self-assemble to form spherical nanoparticles having a diameter of 30-40 nm, as shown in the SEM (Scanning Electron Microscopy) image of FIG. 3.

Figure 4:
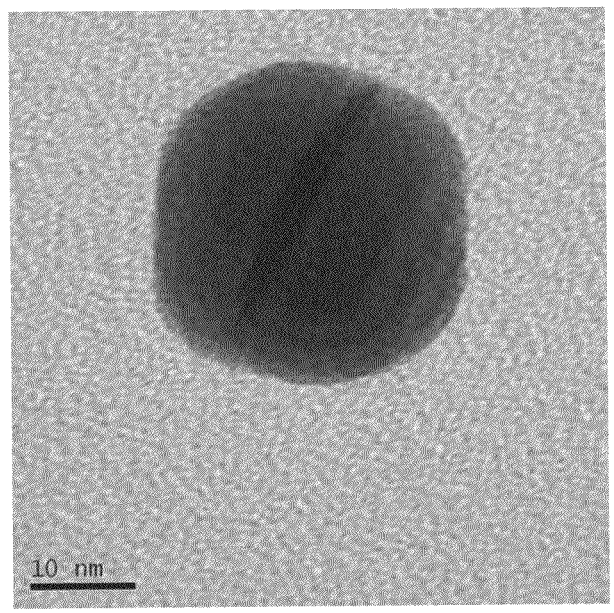
FIG. 4 shows a TEM image of a spherical nanoparticle formed by the aggregation of an amphiphilic copolymer according to one embodiment of the present invention.

Refer to FIG. 4 for a TEM (Transmission Electron Microscopy) image of the nanoparticle formed by the self-assembly of the amphiphilic copolymer in a mixed solvent of IPA and $H_2O$ by a ratio of 1:2. Laminate crystalline phases of silicon dioxide are observed in the TEM image. It is presumed that the amphiphilic copolymer is likely to self-assemble in a hydrophilic-lipophilic environment. It is also observed in the TEM image that the crystalline phases of silicon dioxide are in form of laminates arranged neatly and each having a thickness of 3 nm. The generation of the silicon-dioxide phases may be attributed to that the hydrophilic-lipophilic environment exerts different force fields on the hydrophilic terminals and hydrophobic terminals of the amphiphilic copolymer and that the hydrophilic action force causes the molecules of the hydrophobicity-biased amphiphilic copolymer to self-organize into an ordered arrangement.

Figure 5:
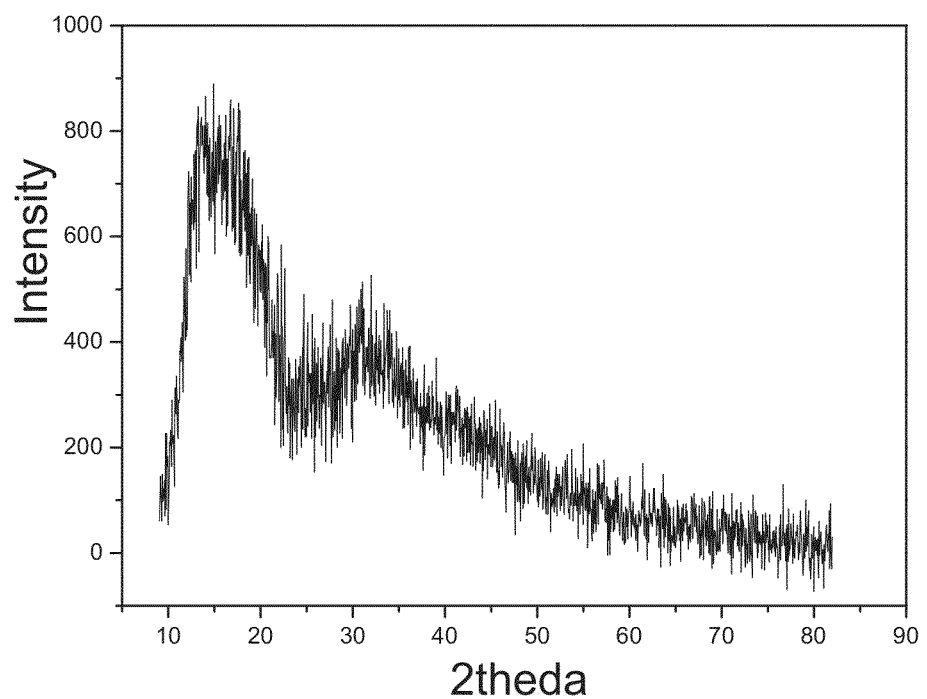
FIG. 5 shows an X-ray diffraction spectrum of an amphiphilic copolymer according to one embodiment of the present invention.

Refer to FIG. 5 for an X-ray diffraction spectrum of the amphiphilic copolymer of the present invention. The peaks respectively appear at about 13 degrees and about 30 degrees of 2theda are exactly the characteristics of crystalline silicon dioxide.

The amphiphilic copolymer of the present invention can also dissolve in IPA. Based on the abovementioned feature, the fabrication of the light- and heat-sensitive oil-soluble drug Vitamin A is used to exemplify the application of the present invention below.

The fabrication process of Vitamin A carried by the amphiphilic copolymer of the present invention includes the following steps:
(1) Dissolving Vitamin A in IPA;
(2) Dissolving the amphiphilic copolymer in IPA to form an IPA solution containing 10% the amphiphilic copolymer; and
(3) Mixing the solutions fabricated in Steps (1) and (2) uniformly, spraying the resultant solution on contact lenses available in the market, and drying the contact lenses.

Figure 6:
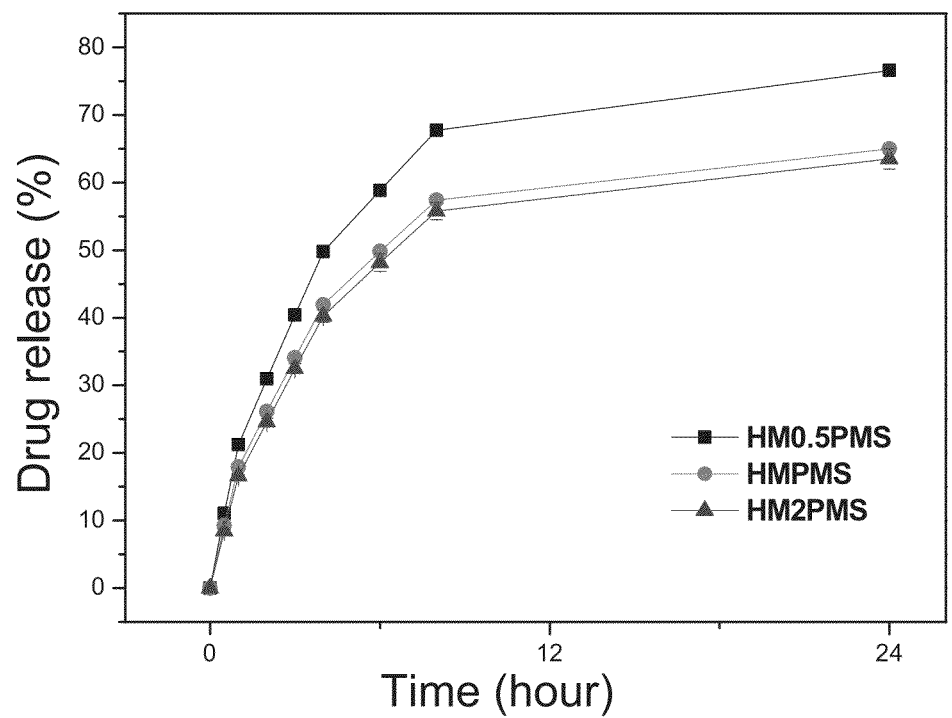
FIG. 6 shows the drug releasing behavior of Vitamin A to 2.5% Tween20, wherein Vitamin A is mixed with amphiphilic copolymers respectively modified by different concentrations of PDMS according to one embodiment of the present invention.

Experiments are undertaken to observe the effects of PDMS concentrations on the release rates of Vitamin A to 2.5% Tween20, wherein the solutions of Vitamin A and the amphiphilic copolymers, which are respectively modified by different concentrations of PDMS, are sprayed on commercial contact lenses. Refer to FIG. 6 for the experimental results. It can be observed in FIG. 6: the higher the PDMS concentration, the less the swelling of molecular structure, and the lower the drug release rate.

Figure 7:
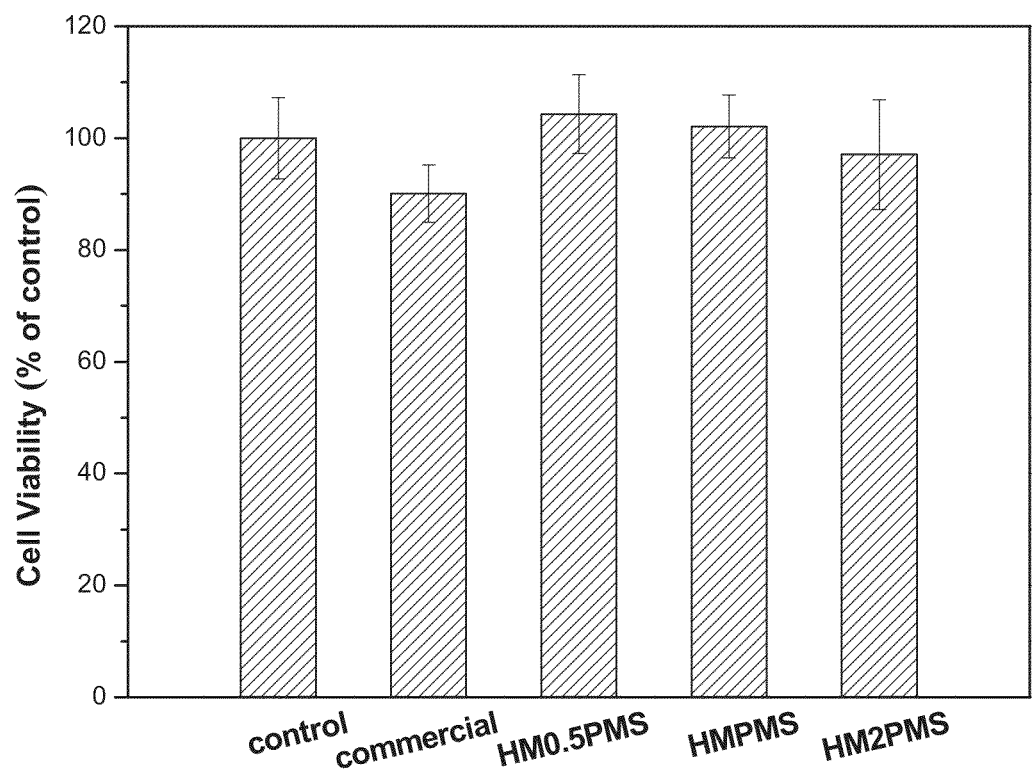
FIG. 7 shows the results of the cytotoxicity test, wherein BCE is used to test the cytotoxicity of the amphiphilic copolymers modified by different concentrations of PDMS and coated on commercial contact lenses according to one embodiment of the present invention.
Figure 8:
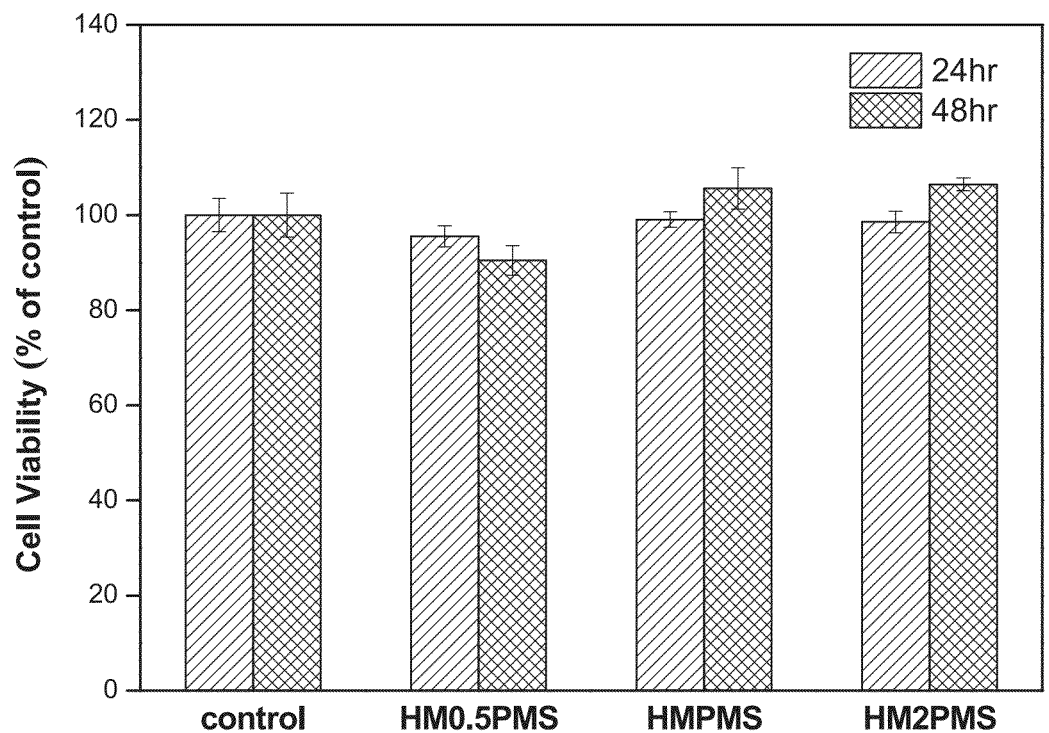
FIG. 8 shows the results of the cytotoxicity test, wherein Hs68 is used to test the cytotoxicity of the amphiphilic copolymers modified by different concentrations of PDMS according to one embodiment of the present invention.

Experiments are also undertaken to verify the biocompatibility of the amphiphilic copolymer of the present invention, wherein BCE (bovine cornea endothelial from BCRC (Bioresource Collection and Research Cente, BCRC No. 60044) and Hs68 (Human foreskin fibroblast from BCRC, BCRC No. 60038) are used in the cytotoxicity tests. Refer to FIG. 7 and FIG. 8 for the results of the cytotoxicity tests. The test results prove the superior biocompatibility of the amphiphilic copolymer of the present invention. In the case that the amphiphilic copolymers modified by different concentrations of PDMS are coated on commercial contact lenses, the biocompatibility of the amphiphilic copolymers is obviously increased for BCE. In the case that Hs68 is cultured together with the amphiphilic copolymers, the cell viability is still over 90% two days later.

In conclusion, the present invention uses a simple process to join PDMS and the hydrophilic p(HEMA-MAA) copolymer to form a PDMS-modified p(HEMA-MAA) amphiphilic copolymer, which dissolves in alcohols containing less than three carbon atoms and has higher hydrophilicity than the traditional silicone hydrogel. The amphiphilic copolymer of the present invention features surface hydrophobicity and dissolves in polar solvents. Therefore, the copolymer of the present invention has high workability and can apply to various hydrophobically-modified anti-fouling coating materials. Further, the amphiphilic copolymer of the present invention can also apply to various fields of biomedicine because of its high workability, high hydrophobicity, high oxygen permeability and super biocompatibility.

The embodiments described above are only to exemplify the present invention to enable the persons skilled in the art to understand, make and use the present invention. However, these embodiments are not intended to limit the scope of the present invention. Any equivalent modification or variation according to the spirit of the present invention is to be also included within the scope of the present invention.

What is claimed is:

1. A dissoluble poly(dimethylsiloxane)-modified poly(2-hydroxyethyl methacrylate-methacrylic acid) amphiphilic copolymer, comprising compounds respectively expressed by Structural Formula I and Structural Formula II:

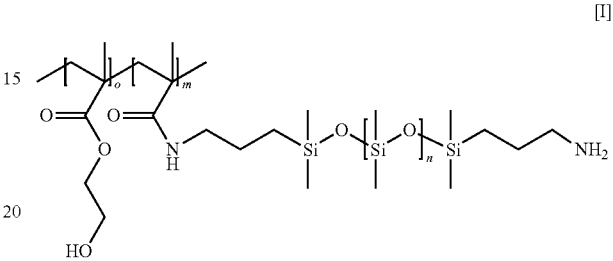

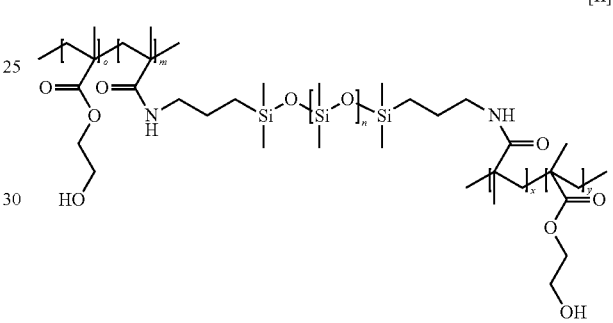

and wherein m is an arbitrary integer of 1~10, n is an arbitrary integer of 1~40, x is an arbitrary integer of 1~10, y is an arbitrary integer of 1~10, and o is an arbitrary integer of 1~10.

2. The dissoluble poly(dimethylsiloxane)-modified poly (2-hydroxyethyl methacrylate-methacrylic acid) amphiphilic copolymer according to claim 1, which is dissoluble in polar solvents.

3. The dissoluble poly(dimethylsiloxane)-modified poly (2-hydroxyethyl methacrylate-methacrylic acid) amphiphilic copolymer according to claim 2, wherein said polar solvents include ethanol, propanol, isopropyl alcohol, polyethylene glycol, polypropylene glycol, methyl sulfoxide, and mixtures thereof.

4. The dissoluble poly(dimethylsiloxane)-modified poly (2-hydroxyethyl methacrylate-methacrylic acid) amphiphilic copolymer according to claim 1, which self-assembles in an aqueous solution to form spherical nanoparticles having a diameter of 30-40 nm.

5. The dissoluble poly(dimethylsiloxane)-modified poly (2-hydroxyethyl methacrylate-methacrylic acid) amphiphilic copolymer according to claim 1, which has a molecular weight of 3500-30000.

6. The dissoluble poly(dimethylsiloxane)-modified poly (2-hydroxyethyl methacrylate-methacrylic acid) amphiphilic copolymer according to claim 1, which is fabricated into a transparent film or a nanoparticle, wherein said transparent film or said nanoparticle is used to transport drugs.

7. A method for fabricating a dissoluble poly(dimethylsiloxane)-modified poly(2-hydroxyethyl methacrylate-methacrylic acid) amphiphilic copolymer, comprising steps:

dissolving 2-hydroxyethyl methacrylate (HEMA) and methacrylic acid (MAA) in deionized water to form a first solution, adding a photo initiator to said first solution to form a second solution, agitating said second solution uniformly, and illuminating said second solution with ultraviolet ray to polymerized compounds in said second solution to form a third solution, which is a white-colored solution containing a copolymer;

adding an activating reagent and an alcohol solvent to said third solution containing said copolymer to form a fourth solution, and agitating said fourth solution uniformly to form a mixture solution;

slowly dripping a dimethylsiloxane (DMS) solution to said mixture solution to form a fifth solution, adding a catalyst to said fifth solution to form a sixth solution, and agitating said sixth solution uniformly to form a solution of a poly(dimethylsiloxane)(PDMS)-modified poly(HEMA-MAA) amphiphilic copolymer.

8. The method according to claim 7, wherein said HEMA and said MAA are mixed by a weight ratio of from 100:10 to 100:100.

9. The method according to claim 8, wherein said HEMA plus said MAA and said deionized water are mixed by a weight ratio of from 1:100 to 10:100.

10. The method according to claim 7 further comprising a step of dialyzing said solution of said PDMS-modified p(HEMA-MAA) amphiphilic copolymer to form powdered PDMS-modified p(HEMA-MAA) amphiphilic copolymer.

11. The method according to claim 10, wherein said powdered PDMS-modified p(HEMA-MAA) amphiphilic copolymer is dissoluble in polar solvents.

12. The method according to claim 11, wherein said polar solvents include ethanol, propanol, isopropyl alcohol, polyethylene glycol, polypropylene glycol, methyl sulfoxide, and mixtures thereof.

13. The method according to claim 10, wherein isopropyl alcohol, propanol or ethanol is used as a dialysate in said step of dialyzing said solution of said PDMS-modified p(HEMA-MAA) amphiphilic copolymer.

14. The method according to claim 10, wherein said powdered amphiphilic copolymer dissolves in an aqueous solution and self-assembles into spherical nanoparticles having a diameter of 30-40 nm in an aqueous solution.

15. The method according to claim 7, wherein said DMS solution is a mixture of DMS and an alcohol solvent.

16. The method according to claim 15, wherein said copolymer is covalently bonded with said DMS by a ratio of from 100:1 to 100:40.

17. The method according to claim 15, wherein said alcohol solvent is ethanol, propanol, isopropyl alcohol, polyethylene glycol, polypropylene glycol, or a mixture thereof.

18. The method according to claim 7, wherein said photo initiator is 2-hydroxy-2-methyl propiophenone (Darocur 1173).

19. The method according to claim 7, wherein said alcohol solvent is selected from a group consisting of ethanol, propanol, isopropyl alcohol, polyethylene glycol, polypropylene glycol, and mixtures thereof.

20. The method according to claim 7, wherein said activating reagent is N-hydroxysuccinimide (NHS).

21. The method according to claim 7, wherein said catalyst is 1-Ethyl-3-(3-dimethylaminopropyl) carbodiimide (EDC).

* * * * *